(12) United States Patent
Matsushita et al.

(10) Patent No.: US 9,748,826 B2
(45) Date of Patent: Aug. 29, 2017

(54) WINDING METHOD, WINDING APPARATUS, AND STATOR

(75) Inventors: Masayuki Matsushita, Toyota (JP); Kenji Harada, Miyoshi (JP); Shingo Fubuki, Toyota (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 713 days.

(21) Appl. No.: 12/991,221

(22) PCT Filed: Apr. 20, 2009

(86) PCT No.: PCT/JP2009/058222
§ 371 (c)(1),
(2), (4) Date: Nov. 5, 2010

(87) PCT Pub. No.: WO2009/142097
PCT Pub. Date: Nov. 26, 2009

(65) Prior Publication Data
US 2011/0057537 A1 Mar. 10, 2011

(30) Foreign Application Priority Data
May 21, 2008 (JP) .................................. 2008-132730

(51) Int. Cl.
*H01F 41/04* (2006.01)
*B21F 1/00* (2006.01)
(Continued)

(52) U.S. Cl.
CPC ......... *H02K 15/045* (2013.01); *H01F 41/071* (2016.01); *H02K 3/18* (2013.01); *H02K 15/066* (2013.01); *Y10T 29/49071* (2015.01)

(58) Field of Classification Search
CPC ... H01F 41/065; H02K 15/045; H02K 15/066
(Continued)

(56) References Cited

U.S. PATENT DOCUMENTS 6,833,648 B2* 12/2004 Gorohata et al. ............. 310/180
6,903,479 B2*  6/2005 Kato et al. .................... 310/208
(Continued)

FOREIGN PATENT DOCUMENTS

EP  1 710 896 A2  10/2006
EP  1 914 866 A    4/2008
(Continued)

OTHER PUBLICATIONS

Translation of foreign document JP 2006288025 A (year 2006).*
Translation of foreign document JP 2006130550 A (Year: 2006).*

*Primary Examiner* — Alex W Mok
(74) *Attorney, Agent, or Firm* — Andrews Kurth Kenyon LLP

(57) ABSTRACT

A winding method of forming a coil by edgewise bending a flat rectangular conductor comprises a step of edgewise bending the rectangular conductor to form edgewise bending portions so that two predetermined two adjacent bent portions are formed so that an outward bulging portion to be generated by edgewise-bending of the flat rectangular conductor is generated in a concentrated manner in a side between the two edgewise bent portions, and the side having the bulging portion constitutes each of a pair of opposite sides of the coil.

2 Claims, 9 Drawing Sheets

(51) Int. Cl.
*H02K 3/04* (2006.01)
*H01F 41/00* (2006.01)
*H02K 15/04* (2006.01)
*H02K 3/18* (2006.01)
*H01F 41/071* (2016.01)
*H02K 15/06* (2006.01)

(58) Field of Classification Search
USPC .................................. 310/208, 201; 29/605
See application file for complete search history.

(56) References Cited

U.S. PATENT DOCUMENTS

| | | | | |
|---|---|---|---|---|
| 7,155,805 | B2* | 1/2007 | Nakamura | 29/596 |
| 8,193,676 | B2* | 6/2012 | Hashimoto et al. | 310/207 |
| 8,225,491 | B2* | 7/2012 | Hashimoto et al. | 29/605 |
| 2003/0102761 | A1* | 6/2003 | Wada et al. | 310/208 |
| 2004/0040142 | A1* | 3/2004 | Hirota et al. | 29/596 |
| 2004/0046476 | A1* | 3/2004 | Becherucci et al. | 310/207 |
| 2004/0108786 | A1* | 6/2004 | Niimi et al. | 310/201 |
| 2005/0046298 | A1* | 3/2005 | Niimi et al. | 310/201 |
| 2005/0188532 | A1* | 9/2005 | Kato et al. | 29/606 |
| 2005/0258704 | A1* | 11/2005 | Oohashi et al. | 310/216 |
| 2006/0103255 | A1* | 5/2006 | Seguchi et al. | 310/201 |
| 2006/0230603 | A1* | 10/2006 | Hirota et al. | 29/605 |
| 2007/0024249 | A1* | 2/2007 | Dooley | 322/44 |
| 2007/0145852 | A1* | 6/2007 | Schon et al. | 310/180 |
| 2008/0007133 | A1* | 1/2008 | Onimaru et al. | 310/208 |
| 2008/0024030 | A1* | 1/2008 | Saboi et al. | 310/208 |
| 2009/0249613 | A1* | 10/2009 | Takada et al. | 29/605 |
| 2010/0000624 | A1 | 1/2010 | Matsushita et al. | |

FOREIGN PATENT DOCUMENTS

| | | | | |
|---|---|---|---|---|
| JP | 2002-184639 | A | | 6/2002 |
| JP | 2006130550 | A | * | 5/2006 |
| JP | 2006-288025 | A | | 10/2006 |
| JP | 2006-295106 | A | | 10/2006 |
| JP | 2007-074881 | A | | 3/2007 |
| JP | 4059888 | B2 | | 3/2008 |
| JP | 2008228435 | A | | 9/2008 |

* cited by examiner

WINDING METHOD, WINDING APPARATUS, AND STATOR

This is a 371 national phase application of PCT/JP2009/058222 filed 20 Apr. 2009, which claims priority to Japanese Patent Application No. 2008-132730 filed 21 May 2008, the contents of which are incorporated herein by reference.

TECHNICAL FIELD

The present invention relates to a technique of forming a coil by edgewise bending a flat rectangular conductor and, in particular, to a technique of improving dimensional accuracy of a coil.

BACKGROUND ART

Recently, there is an increasing demand for high output and small size of a drive motor which is mounted in a hybrid electric vehicle. Accordingly, a method of forming a coil by edgewise bending a flat rectangular conductor (wire) having a flat rectangular cross-section has been studied.

Patent Literature 1 discloses a technique for a rectangular coil, a rectangular coil manufacturing method, and a rectangular coil manufacturing apparatus.

According to this technique, when the flat rectangular conductor is to be edgewise bent, an inner periphery side of an edgewise bent portion of the flat rectangular conductor is limited in a thickness direction by use of a tool to prevent the edgewise bent portion from expanding or bulging.

When a flat rectangular conductor is edgewise bent, generally, an outer periphery side of an edgewise bent portion of the flat rectangular conductor becomes longer than an inner periphery side. This is because a force caused by an edgewise bending operation acts on the flat rectangular conductor to extend the outer periphery side of the flat rectangular conductor but compress the inner periphery side thereof.

Consequently, the flat rectangular conductor is likely to be formed in a shape having the edgewise bent portion in which the inner periphery side is thick and the outer periphery side thin. When the inner periphery side of the flat rectangular conductor becomes thick, generating outward bulging portions, the adjacent coils when mounted in the stator core will interfere with each other due to such bulging portions. When the coil formed of the flat rectangular conductor edgewise bent by this method is mounted in a stator core, the above shape is likely to deteriorate a space factor of a stator.

In Patent Literature 1, accordingly, the inner periphery side of the flat rectangular conductor is limited to a predetermined width during edgewise bending, thereby preventing the thickness of the edgewise bent portion of the flat rectangular conductor from increasing.

Patent Literature 2 discloses a technique for an edgewise winding method and apparatus. In this technique of the Patent Literature 2, as with Patent Literature 1, a tool including a press mechanism is used to press the inner periphery side of the edgewise bent portion in order to prevent the thickness of the edgewise bent portion of the flat rectangular conductor from increasing. Such pressurizing of the inner periphery side of the edgewise bent portion by the press mechanism through the tool during edgewise bending of the flat rectangular conductor prevents an increase in thickness of the edgewise bent portion of the flat rectangular conductor.

CITATION LIST

Patent Literature

Patent Literature 1: JP2006-288025A
Patent Literature 2: JP2007-74881A

SUMMARY OF INVENTION

Technical Problem

However, Patent Literatures 1 and 2 seem to have the following problems.

Firstly, an explanation will be given to a cause that deteriorates the dimensional accuracy of an edgewise bent portion 10a of a flat rectangular conductor 10 and its surrounding portion, which has been experimentally revealed by applicant of the present application. FIG. 10 is a schematic view showing that the flat rectangular conductor 10 is to be edgewise bent. FIG. 11 is a schematic view of the edgewise bent portion 10a of the flat rectangular conductor 10. An edgewise-bending winding apparatus 20 includes a first wire guide 21, a second wire guide 22, a bending tool 23, and a flange retainer 24. The winding apparatus 20 further includes an unillustrated feeding mechanism for feeding the flat rectangular conductor 10 and others.

The first wire guide 21 is a tool for pressing an outer periphery side surface of the flat rectangular conductor 10. The second wire guide 22 is a tool for pressing an inner periphery side surface of the flat rectangular conductor 10. These first and second wire guides 21 and 22 serve to guide the flat rectangular conductor 10 in a direction of the width thereof. The first and second wire guides 21 and 22 are placed apart at a distance determined by adding a clearance "A" to a minimum width "W" of the flat rectangular conductor 10. This clearance "A" is determined taking into account a dimensional tolerance of the flat rectangular conductor 10 to prevent galling of the flat rectangular conductor 10 during forward feeding of the flat rectangular conductor 10.

When the flat rectangular conductor 10 is to be edgewise bent, the flat rectangular conductor 10 is pressed in the thickness direction by a flange of the flange retainer 24 having a columnar shape. The bending tool 23 is then rotated around the flange retainer 24 to edgewise bend the flat rectangular conductor 10. At this time, the flat rectangular conductor 10 is pressed against the retainer 24. Thus, stress tends to concentrate at a stress concentrated portion Sp and a highest load is applied to this area.

As a result, every time the rectangular conductor 10 is edgewise bent to form an edgewise bent portion 10a, a first deformed portion P1 generated due to the existence of the clearance "A" and a second deformed portion P2 generated due to the shape of the retainer 24 are formed near each bent portion 10a, i.e., in each side of a layer forming the coil as shown in FIG. 11. Actually, amounts of deformation of the first and second deformed portions P1 and P2 are not so large as shown in FIGS. 10 and 11. However, those deformed portions P1 and P2 are likely to deteriorate a space factor of the coil when the coil is mounted in the stator core.

Patent Literatures 1 and 2 therefore have focused attention to an increase in thickness of the inner periphery side of the edgewise bent portion of the flat rectangular conductor. To enhance the dimensional accuracy of the edgewise bent portion, however, it seems insufficient to merely hold or pressurize the inner periphery side by the tool.

The present invention has been made to solve the above problems and has a purpose to provide a winding method, a winding apparatus, and a stator, to reduce interference of adjacent coils due to unnecessary bulging portions that are likely to occur in an edgewise bent portion when a flat rectangular conductor is edgewise bent.

Solution to Problem (1) To achieve the above object, one aspect of the present invention provides a winding method of forming a coil having a long side and a short side by edgewise bending a flat rectangular conductor by use of a pair of wire guides, a first side surface supporting tool, and a support member, the method comprising the step of performing edgewise bending of a first bent portion by bending a part of the flat rectangular conductor to be the long side about an outer periphery of the support member by the first side surface supporting tool while a part to be the short side is held by the pair of the wire guides; and performing edgewise bending of a second bent portion by bending another part of the flat rectangular conductor to be the long side about the outer periphery of the support member by the pair of the wire guides while the part to be the short side is held by the first side surface supporting tool.

(2) To achieve the above object, another aspect of the present invention provides a winding apparatus for forming a coil having a long side and a short side by edgewise bending a flat rectangular conductor by use of a pair of wire guides, a first side-surface supporting tool, and a support member, the apparatus comprising: the support member for supporting an inner periphery of the flat rectangular conductor during edgewise bending of the flat rectangular conductor; the first side-surface supporting tool that is rotatable and will support a side surface of the flat rectangular conductor; and the pair of the wire guides that is rotatable and will support the side surface of the flat rectangular conductor and be placed adjacent to the first side surface supporting tool with respect to the support member, wherein the apparatus is adapted to conductor by use of a pair of wire guides, a first side surface supporting tool, and a support member; and a stator core in which the coil is mounted, wherein the coil is formed by alternately performing edgewise bending of a first bent portion by bending a part of the flat rectangular conductor to be the long side about an outer periphery of the support member by the first side surface supporting tool while a part to be the short side is held by the pair of the wire guides and perform edgewise bending of a second bent portion by bending another part of the flat rectangular conductor to be the long side about the outer periphery of the support member by the pair of the wire guides while the part to be the short side is held by the first side surface supporting tool.

Advantageous Effects of Invention

The winding method having the above configuration can provide the following operations and effects.

In the winding method (1) of forming the coil having the long side and the short side by edgewise bending the flat rectangular conductor by use of the pair of the wire guides, the first side surface supporting tool, and the support member, the method comprising the step of: performing edgewise bending of a first bent potion by bending a part of the flat rectangular conductor to be the long side about the outer periphery of the support member by the first side surface supporting tool while a part to be the short side is held by the pair of the wire guides; and performing edgewise bending of a second bent portion by bending another part of the flat rectangular conductor to be the long side about the outer periphery of the support member by the pair of the wire guides while the part to be the short side is held by the first side surface supporting tool.

In the case where the flat rectangular conductor is edgewise bent, the first and second deformed portions P1 and P2 as explained in the Technical Problem section are generated. The first and second deformed portions P1 and P2 will interfere with the stator core when the coil is mounted in the stator core, thus causing a problem that deteriorates the space factor of the stator. To avoid such defect, the coil is formed in a way of performing edgewise bending of a first bent potion by bending a part of the flat rectangular conductor to be the long side about the outer periphery of the support member by the first side surface supporting tool while a part to be the short side is held by the pair of the wire guides and performing edgewise bending of a second bent portion by bending another part of the flat rectangular conductor to be the long side about the outer periphery of the support member by the pair of the wire guides while the part to be the short side is held by the first side surface supporting tool so that the first and second deformed portions P1 and P2 are concentrated in one side and this side constitutes each of a pair of opposite sides in one layer of a wound conductor forming the coil. Thus, the coil is mounted in the stator core so that one of the pair of opposite sides is located on a coil end side of the stator core in which a coil end is placed. By mounting the coil in the stator core to bring the pair of opposite sides on the coil end side of the stator core, it is possible to enhance the space factor of the stator.

The winding apparatus having the above configuration can provide the following operations and effects.

The winding apparatus (2) for forming a coil having a long side and a short side by edgewise bending a flat rectangular conductor by use of a pair of wire guides, a first side-surface supporting tool, and a support member comprises: the support member for supporting an inner periphery of the flat rectangular conductor during edgewise bending of the flat rectangular conductor; the first side-surface supporting tool that is rotatable and will support a side surface of the flat rectangular conductor; and the pair of the wire guides that is rotatable and will support the side surface of the flat rectangular conductor and be placed adjacent to the first side surface supporting tool with respect to the support member, wherein the apparatus is adapted to alternately rotate the first side-surface supporting tool and the pair of the wire guides to edgewise bend the flat rectangular conductor. The winding apparatus is adapted to form the coil by alternately performing edgewise bending of a first bent portion by bending a part of the flat rectangular conductor to be the long side about the outer periphery of the support member by the first side surface supporting tool while a part to be the short side is held by the pair of the wire guides and performing edgewise bending of a second bent portion by bending another part of the flat rectangular conductor to be the long side about the outer periphery of the support member by the pair of the wire guides while the part to be the short side is held by the first side surface supporting tool.

In this case, as with (1), the first side-surface supporting tool and the pair of the wire guides are alternately operated to form a coil by edgewise bending the flat rectangular conductor so that the first and second deformed portions are concentrated in one side and this side constitutes each of a pair of opposite sides of the coil. The coil is mounted in the stator core so that the pair of opposite sides is placed in end portions of the stator. Thus, a space factor of the stator can be enhanced.

The stator having the above configuration can provide the following operations and effects.

In the stator (3) comprising: the coil having the long side and the short side formed by edgewise bending the flat rectangular conductor by use of the pair of the wire guides, the first side surface supporting tool, and the support member; and the stator core in which the coil is mounted, the coil is formed by alternately performing edgewise bending of a first bent portion by bending a part of the flat rectangular conductor to be the long side about the outer periphery of the support member by the first side surface supporting tool while a part to be the short side is held by the pair of the wire guides and performing edgewise bending of a second bent portion by bending another part of the flat rectangular conductor to be the long side about the outer periphery of the support member by the pair of the wire guides while the part to be the short side is held by the first side surface supporting tool.

The coil has the bulging portion in each of the pair of opposite sides and is mounted in the stator core so that such sides having the bulging portions are placed on the end portions of the stator, thereby allowing an increase in space factor of the stator. Such coil can be formed by the winding method (1) and the winding apparatus (2).

DESCRIPTION OF EMBODIMENTS

Figure 1:
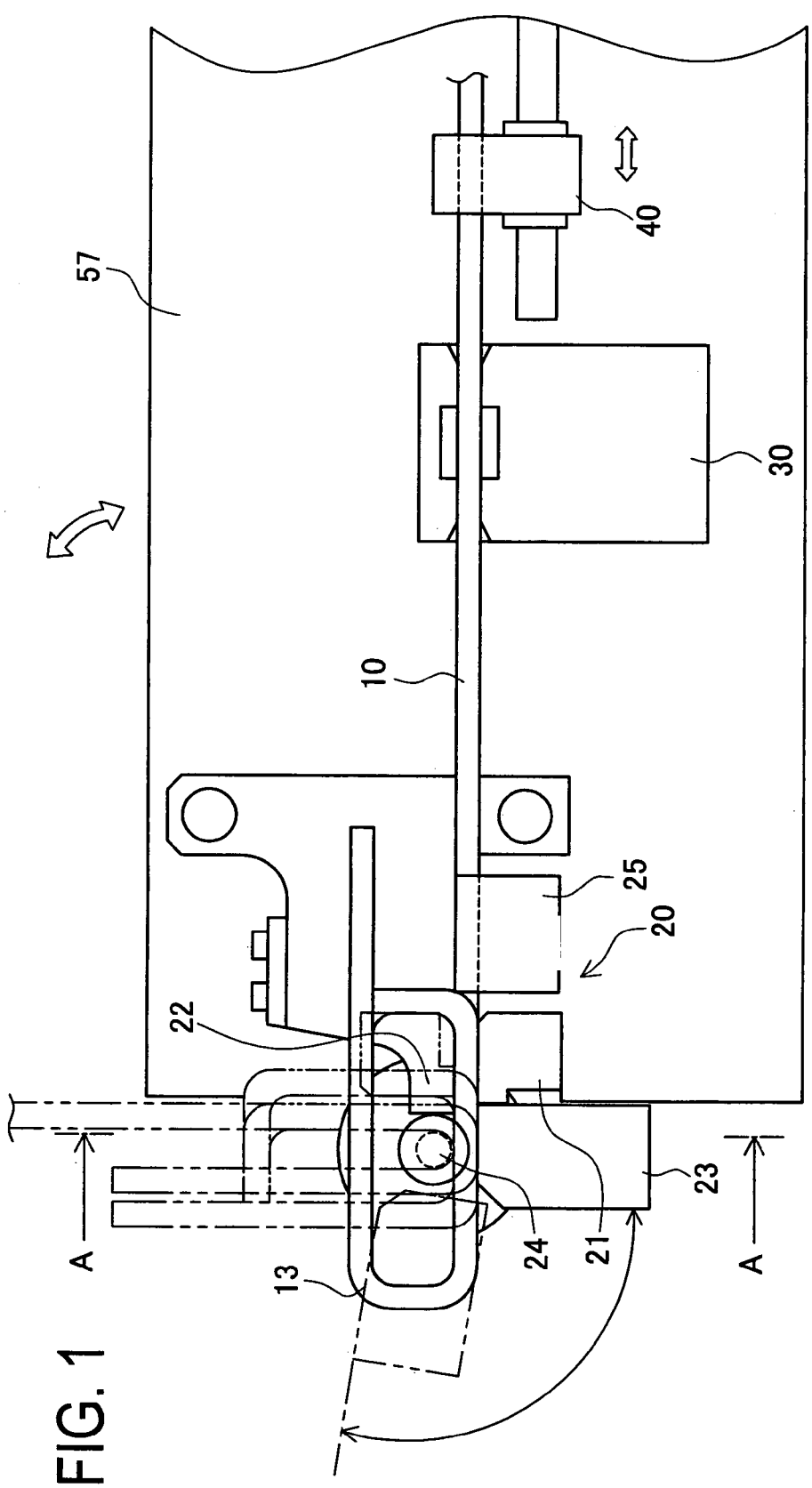
FIG. 1 is a schematic plan view of an edgewise-bending winding apparatus of a preferred embodiment.
Figure 2:
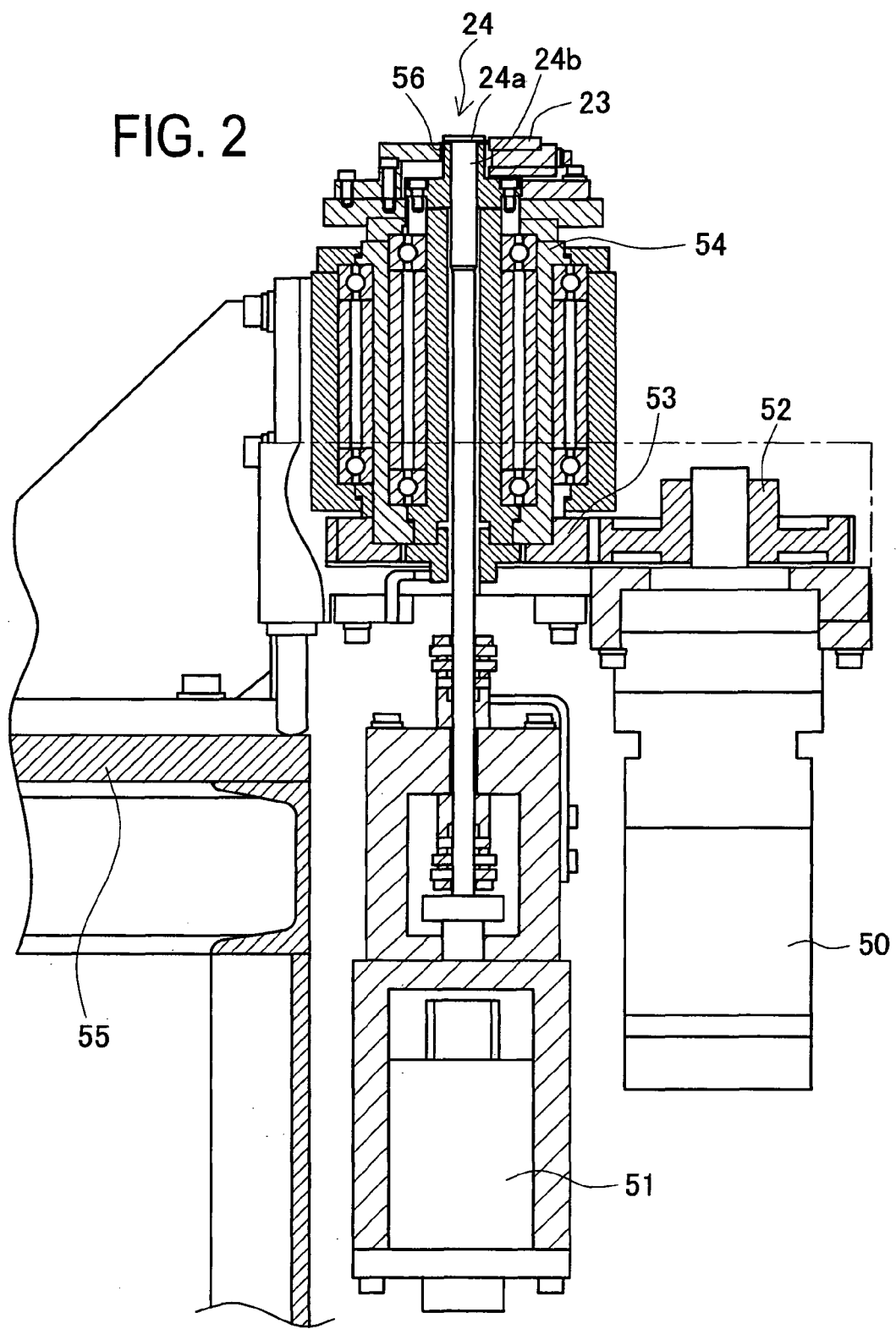
FIG. 2 is a schematic sectional view of the edgewise-bending winding apparatus of the embodiment.

A detailed description of a preferred embodiment of the present invention will now be given referring to the accompanying drawings. FIG. 1 is a schematic view of an edgewise-bending winding apparatus (hereinafter, also simply referred to as "winding apparatus") 20. FIG. 2 is a schematic sectional view of this winding apparatus 20.

The winding apparatus 20 includes a first wire guide 21, a second wire guide 22, a bending tool 23, and a flange retainer 24. The apparatus 20 further includes a clamp unit 30 and a wire feeding mechanism 40. The first wire guide 21, the second wire guide 22, a wire guide 25, the clamp unit 30, and the wire feeding mechanism 40 are placed on a common movable base 57.

The first wire guide 21 is placed on an outer periphery side in a bending direction of a rectangular conductor 10 to be edgewise bent in order to support a side surface of the rectangular conductor 10. In other words, the first wire guide 21 is located on an outer periphery side of a coil 13 to be formed. The rectangular conductor 10 which is a wire having a flat rectangular cross section is made of metal having superior electrical conductivity such as copper and aluminum and is coated with an insulating film or layer.

The second wire guide 22 is a member fixed to the winding apparatus 20 and placed on an inner periphery side in the bending direction of the rectangular conductor 10. In other words, the second wire guide 22 is adapted to press a portion corresponding to the inner periphery side of the coil 13 to be formed by winding the rectangular conductor 10. The second wire guide 22, which is hard to see in FIG. 1, protrudes on the inner periphery side of the coil 13 by a length corresponding to the thickness of the rectangular conductor 10 to support the side surface of the rectangular conductor 10.

Between the first wire guide 21 and the second wire guide 22, the rectangular conductor 10 is allowed to pass through. For this end, the first and second wire guides 21 and 22 are spaced at a distance determined by adding up a minimum width "W" of the rectangular conductor 10 and a clearance "A" determined taking into account a dimensional tolerance in the width direction.

The bending tool 23 is a mechanism for edgewise bending the rectangular conductor 10. This tool 23 is rotated around the flange retainer 24 by a drive force transmitted from a servo motor 50 for bending shown in FIG. 2. The power of the servo motor 50 is transmitted to a first gear 52 and a second gear 53 and then transmitted to the bending tool 23 via a rotary element 54 rotatably supported by a bearing or the like.

The bending tool 23 is placed in contact with an outer periphery surface of the rectangular conductor 10. Thus, rotation of the bending tool 23 applies a force to the rectangular conductor 10. A rotation angle of the bending tool 23 in this embodiment is set to 90 degrees+α degree(s).

The movable base 57 is provided with a rotating mechanism not shown so as to be rotatable by 90 degrees+α degree(s) in a direction opposite to the bending tool 23. The rotating mechanism has only to be configured to rotate the base 57 at a necessary angle by use of a servo motor or the like.

The movable base 57 includes the first wire guide 21, second wire guide 22, wire guide 25, clamp unit 30, and wire feeding mechanism 40, all of which are also moved in association with the rotation of the base 57.

Figure 3:
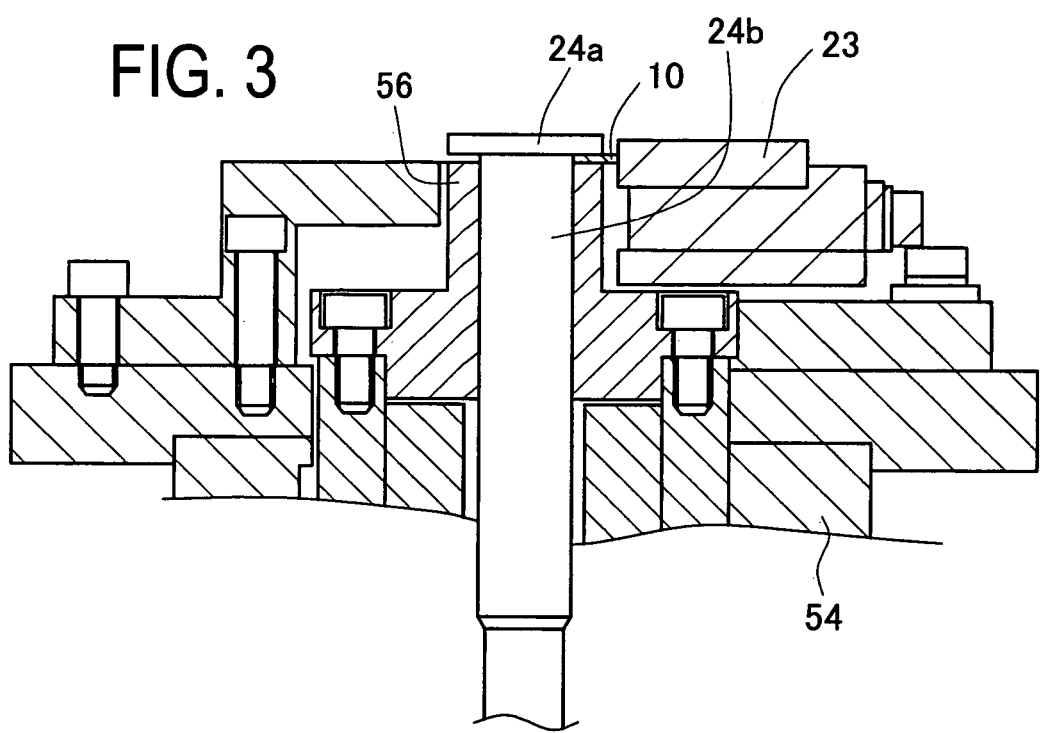
FIG. 3 is an enlarged partial view of the apparatus shown in FIG. 2.

FIG. 3 is an enlarged partial view of the apparatus shown in FIG. 2 and shows a state in which the rectangular conductor 10 is pressed by the flange 24a. The flange retainer 24 has the flange 24a and a shaft 24b as shown in FIG. 3. The shaft 24b is connected to a servo motor 51 for clamping. Furthermore, the shaft 24b is movable downward in FIG. 2 to press the flange 24a against the side surface (a top surface in FIG. 3) of the rectangular conductor 10 in a thickness direction, thereby pressurizing the rectangular conductor 10 to a constant thickness. It is to be noted that the shaft 24b is provided with a stopper not shown for restricting downward movement beyond a fixed amount.

The winding apparatus 20 is fixed to a base 55. The wire guide 25 serves to press the rectangular conductor 10 in the thickness direction and protect the rectangular conductor 10 from separating from the apparatus 20.

The clamp unit 30 has a function of pressing the rectangular conductor 10 in the thickness direction to hold the rectangular conductor 10 against movement. The wire feeding mechanism 40 has a function of feeding the rectangular conductor 10 by a predetermined amount (distance) in an advancing direction. This feeding mechanism 40 is controlled by a servo motor to increase or decrease the feeding amount of the rectangular conductor 10 as the coil 13 is wounded. The clamp unit 30 and the wire feeding mechanism 40 are, as mentioned above, placed on the movable base 57 and moved by the rotation of the base 57.

Figure 4:
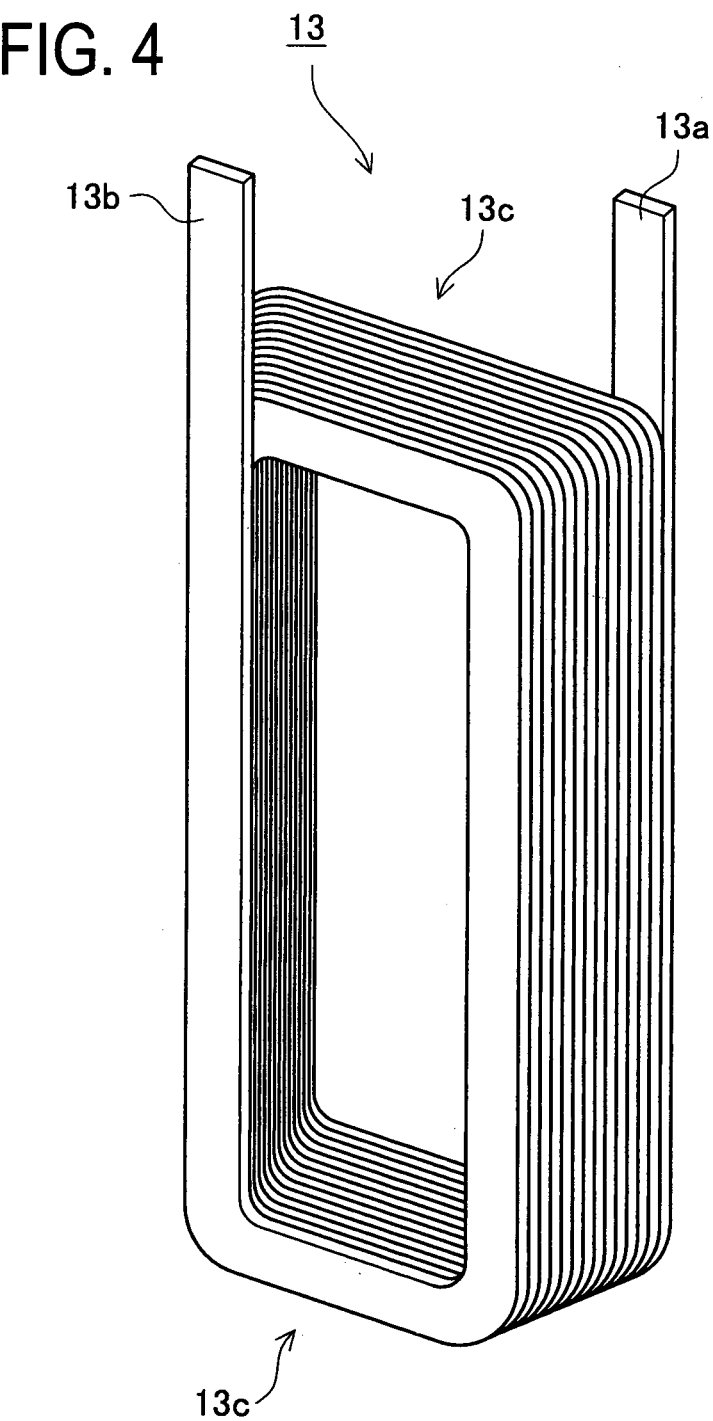
FIG. 4 is a perspective view of a coil of the embodiment.
Figure 5:
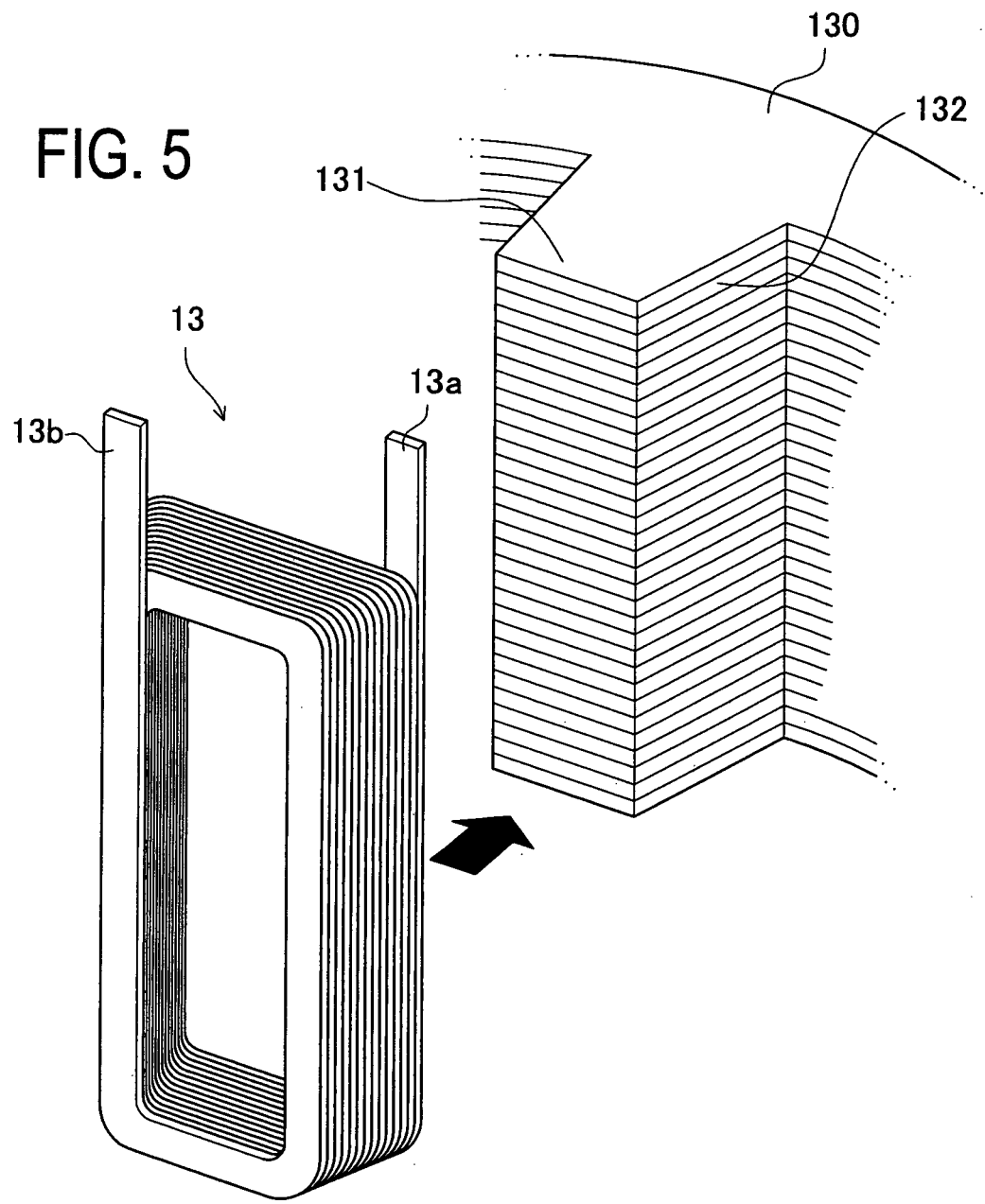
FIG. 5 is a perspective view showing a manner of mounting the coil in a stator core.
Figure 6:
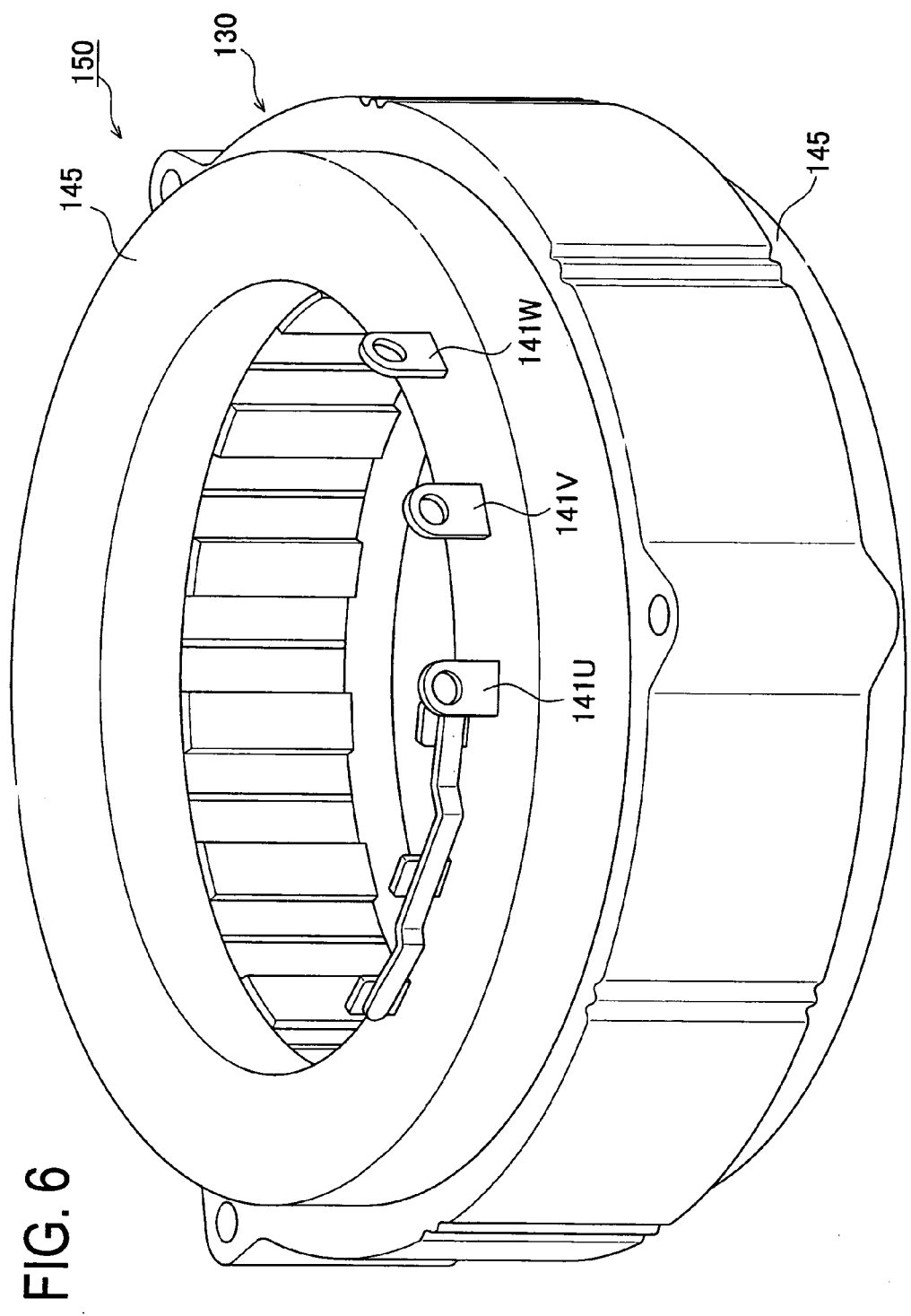
FIG. 6 is a perspective view of a stator of the embodiment.

FIG. 4 is a perspective view of the coil 13. FIG. 5 is a perspective view showing a manner of mounting the coil 13 in a stator core 130. FIG. 6 is a perspective view of a stator 150. The coil 13 is a coil formed by edgewise bending the rectangular conductor 10 to form a plurality of layers (turns) each having a pair of short sides and a pair of long sides by the winding apparatus 20. The coil 13 has a first end 13a and a second end 13b each extending from a wound part by a predetermined length, one of which is a winding start end and the other is a winding finished end. The coil 13 is wound in a nearly trapezoidal shape so that a layer close to the first end 13a has a short side longer than a layer close to the second end 13b. The short sides of the coil 13 form coil end parts 13c which will be placed protruding respectively from both end faces of the stator core 130 when the coil 13 is mounted in the stator core 130.

The coil 13 will be mounted in the stator core 130. To be concrete, the coil 13 is mounted on a teeth part 131 formed in the stator core 130 as shown in FIG. 5. The stator core 130 is formed by laminating a plurality of electromagnetic steel plates punched by press working. The stator core 130 includes teeth parts 131 each protruding inward from the inner periphery of the stator core 130 and slots 132 formed between the teeth parts 131 so that the teeth parts 131 and the slots 132 are arranged alternatively.

The coil 13 is mounted on the teeth part 131 of the stator core 130, and then the first end 13a and the second end 13b are electrically connected to form an electromagnetic circuit, which function as the motor stator 150.

The stator 150 is formed as a stator of a three-phase motor. Accordingly, the coils 13 are connected by a bus bar not shown and thereafter a U-phase terminal 141U, a V-phase terminal 141V, and a W-phase terminal 141W are provided. Both end faces of the stator core 130 are covered by resin mold (resin molded portions 145) to protect the coil 13, the bus bar, and others protruding from the end faces of the stator core 130. The resin molded portions 145 does not preclude the use of a protecting method including curing a varnish.

Figure 7:
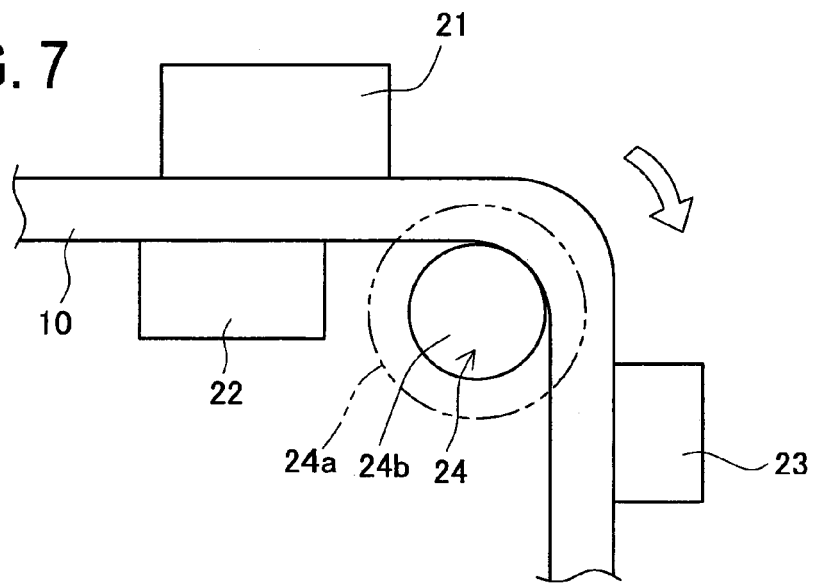
FIG. 7 is a schematic view showing edgewise bending of a flat rectangular conductor by the edgewise-bending winding apparatus of the embodiment.
Figure 8:
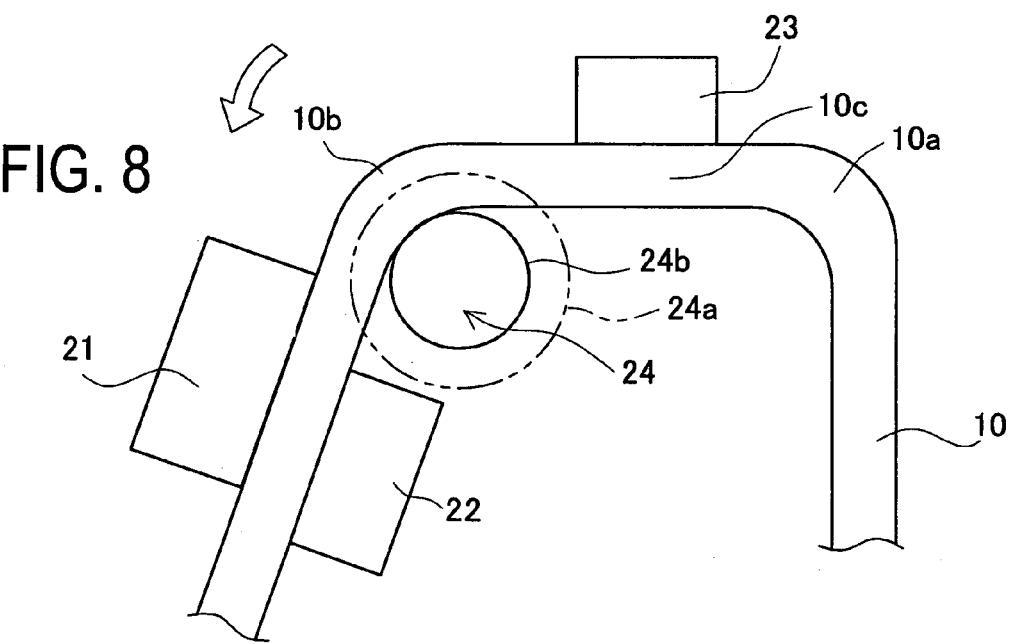
FIG. 8 is a schematic view showing edgewise bending of the flat rectangular conductor by a first wire guide in the embodiment.

Next, operations of the edgewise-bending winding apparatus 20 will be described. FIG. 7 is a schematic view showing a step of edgewise bending the rectangular conductor 10 by use of the bending tool 23. FIG. 8 is a schematic view showing another step of edgewise bending the rectangular conductor 10 by use of the first wire guide 21.

Firstly, a long-side feeding operation for making a long side of one layer of the coil 13 is conducted. The wire feeding mechanism 40 is activated to unreel and feed the rectangular conductor 10 by a length corresponding to the long side from a bobbin not shown, on which the rectangular conductor 10 has been wound, toward the flange retainer 24. Specifically, the wire feeding mechanism 40 clamps the rectangular conductor 10 and feeds it by the length corresponding to the long side of the coil 13 to be formed. After the feeding, the clamp unit 30 clamps the rectangular conductor 10. The wire feeding mechanism 40 then unclamps the rectangular conductor 10 and is returned to a predetermined position.

Successively, the flange retainer 24 is moved down to press the flange 24a against the rectangular conductor 10. The flange retainer 24 is not allowed to move down beyond a predetermined position and hence a lower surface of the flange 24a is held at a predetermined distance (clearance) from an upper surface of a holding table 56. This distance is set to be almost equal to the thickness of the rectangular conductor 10. Accordingly, the rectangular conductor 10 is caught between the flange 24a and the holding table 56.

In this state, the bending tool 23 is rotated. This rotation angle is 90 degrees+α degree(s). The bending tool 23 supports the side surface of the rectangular conductor 10 and therefore the rectangular conductor 10 is edgewise bent while being pressed against the shaft 24b.

To edgewise bend the rectangular conductor 10 at 90 degrees, it is necessary to take into account spring-back of the rectangular conductor 10. The rectangular conductor 10 made of relatively soft metal such as copper and aluminum has a deformation allowance in an elastic range. Accordingly, the rectangular conductor 10 after bending will spring back to some degree. The bending angle of the rectangular conductor 10 is therefore adjusted by an additional angle (α) to form the edgewise bent portion 10a bent at 90 degrees. The rectangular conductor 10 is bent along the outer periphery of the shaft 24b and hence the diameter of an inner periphery of the edgewise bent portion 10a of the rectangular conductor 10 becomes equal to the outer diameter of the shaft 24b.

Thereafter, the flange retainer 24 is moved upward to unclamp the rectangular conductor 10. The bending tool 23 is returned to respective predetermined positions (home position). Then, the clamp unit 30 unclamps the rectangular conductor 10 and the wire feeding mechanism 40 clamps the rectangular conductor 10.

Subsequently, a short-side feeding operation for making a short side of one layer of the coil 13 is conducted. The wire feeding mechanism 40 is activated to feed the rectangular conductor 10 by a length corresponding to the short side of the coil 13 toward the flange retainer 24. Specifically, the wire feeding mechanism 40 clamps and feeds the rectangular conductor 10 by the distance corresponding to the short side of the coil 13 to be formed. Then, the clamp unit 30 clamps the rectangular conductor 10 and, on the other hand, the wire feeding mechanism 40 unclamps the rectangular conductor 10 and returns to the predetermined position.

Thereafter, the flange retainer 24 is moved downward to press the flange 24a against the rectangular conductor 10. The flange retainer 24 is not allowed to move down beyond the predetermined position and hence the lower surface of the flange 24a is held at the predetermined distance (clearance) from the upper surface of the holding table 56. This distance is set to be almost equal to the thickness of the rectangular conductor 10. Accordingly, the rectangular conductor 10 is caught between the flange 24a and the holding table 56.

In this state, the movable base 57 is rotated, thus moving the first wire guide 21. This rotation angle is 90 degrees+α degree(s) as with the bending tool 23. The first wire guide 21 is moved in contact with the side surface of the rectangular conductor 10. Accordingly, the rectangular conductor 10 is edgewise bent while being pressed against the shaft 24b, forming an edgewise bent portion 10b.

The rectangular conductor 10 is bent along the outer periphery of the shaft 24b and hence the diameter of an inner periphery of the edgewise bent portion 10b of the rectangular conductor 10 becomes equal to the outer diameter of the shaft 24b. It is to be noted that the rectangular conductor 10 has to be fed by different feeding amounts (distances) according to whether the short side or the long side of the coil 13 is to be formed and the feeding amounts of the rectangular conductor 10 for the short side has to be changed gradually from turn to turn (layer to layer) to form the coil 13 in a nearly trapezoidal form. In this way, the rectangular conductor 10 is edgewise bent and the coil 13 is finally formed.

The present embodiment configured as above can provide the following operations and effects.

A first effect is to provide a stator structure in which adjacent coils are unlikely to interfere with each other due to unnecessary bulging portions caused in the edgewise bent portions.

In the winding method of the present embodiment for forming the coil by edgewise bending the rectangular conductor 10, two bent portions 10a and 10b are formed at two adjacent places in the rectangular conductor 10 so that an outward bulging portion P to be generated by the edgewise bending of the rectangular conductor 10 is generated in a concentrated manner in a side (in this embodiment, in each of the short sides forming each coil end part 13c of the coil 13) between the two adjacent places and the sides each having the bulging portion P are formed as a pair of opposite sides of each layer (turn) of the coil 13.

Figure 9:
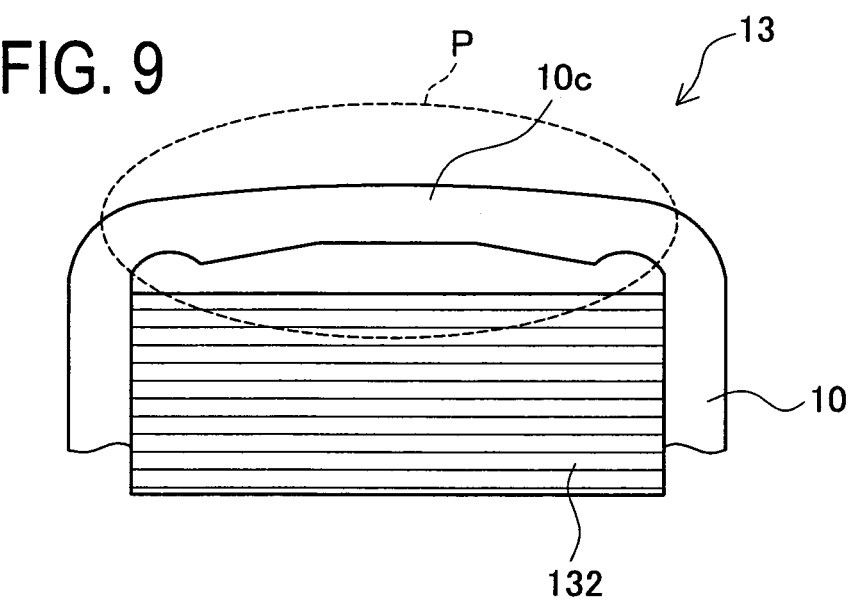
FIG. 9 is a schematic view showing a state in which the coil is mounted in the stator core.
Figure 10:
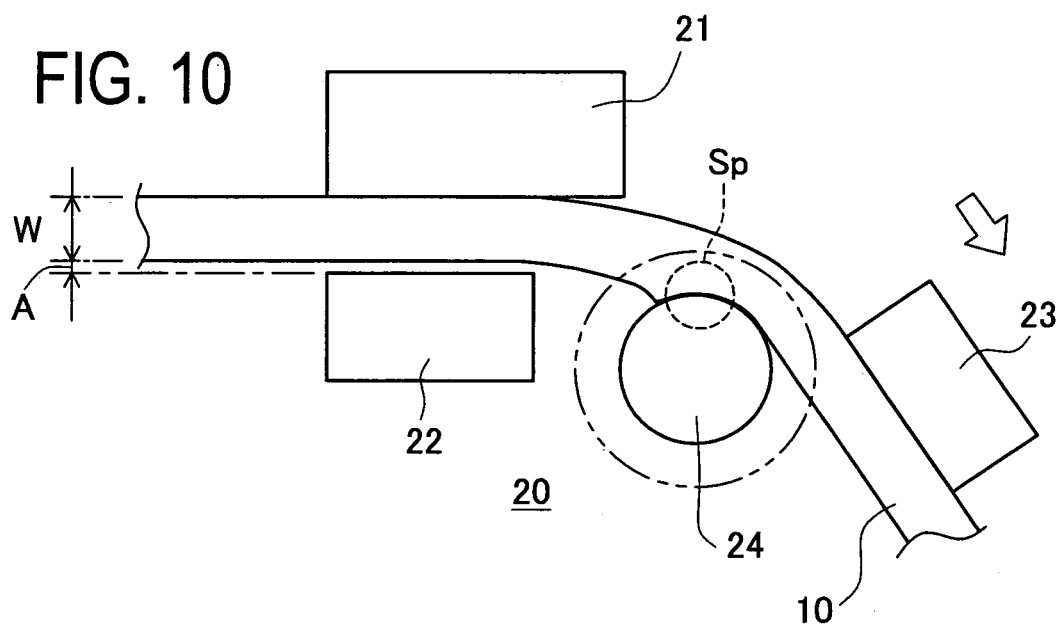
FIG. 10 is a schematic view showing edgewise bending of a flat rectangular conductor used in a study by applicant.
Figure 11:
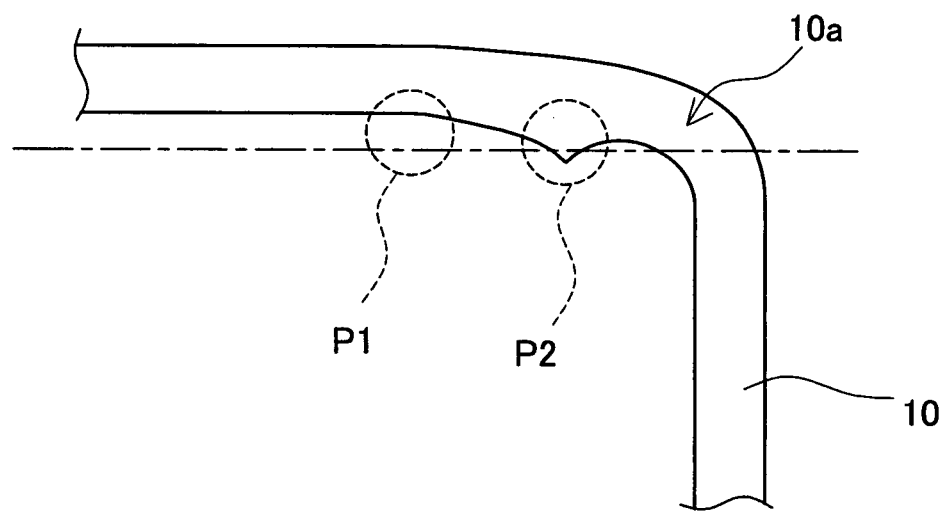
FIG. 11 is a schematic view of an edgewise bent portion of the flat rectangular conductor, which was studied by applicant.

FIG. 9 is a schematic view showing a state in which the coil 13 is mounted in the stator core 130. In the coil 13 formed by the edgewise bending performed in the aforementioned steps, the bulging portion P is formed in a short side portion 10c forming the coil end part 13c which is an upper one in FIG. 9. The clearance between the first and second wire guides 21 and 22 is defined by adding the clearance "A" to the minimum width "W" as shown in FIG. 10. This clearance wider than the actual width of the rectangular conductor 10 is likely to cause deformation of the rectangular conductor 10, thereby forming the bulging portion P. In other words, the bulging portion P is generated because of the occurrence of the first and second deformed portions P1 and P2 as shown in FIG. 11.

When the first edgewise bent portion 10a is to be formed, the first and second deformed portions P1 and P2 would be generated by the existence of the clearance "A" as explained above and in the Technical Problem section. Similarly, when the second edgewise bent portion 10b is to be formed, the first and second deformed portions P1 and P2 may be generated.

When the second edgewise bent portion 10b is to be formed, the bending tool 23 serves as a fixed side as shown in FIG. 8 to support the outer periphery side surface of the rectangular conductor 10. The bending tool 23, as with the first wire guide 21, has to be positioned so as not to interfere with the rectangular conductor 10 during feeding and hence the bending tool 23 is returned to the home position during this edgewise bending to form the second edgewise bent portion 10b. Accordingly, the first and second deformed portions P1 and P2 are likely to be formed in similar shape to those in the first edgewise bent portion 10a.

However, the rectangular conductor 10 is bent alternately by the bending tool 23 and the first wire guide 21, so that the bulging portion P can be generated in each coil end part 13c (each short side portion 10c) of the coil 13 as shown in FIG. 9.

In the case where the coil 13 is mounted in the stator core 130, the coil end portion of the stator core 130 will have no influence on the space factor of the stator 150. The desired dimensional accuracy of the coil 13 is therefore low. Accordingly, even when the bulging portion P is placed on the coil end side of the stator core 130, it will not have much influence on the performance of the stator 150.

On the other hand, if the first and second deformed portions P1 and P2 are formed in a portion (a side) of the coil to be inserted in the slot 132, the space factor is deteriorated as explained in the Technical Problem section.

Accordingly, the first and second deformed portions P1 and P2 which will be formed by the winding apparatus 20 are concentrated in each coil end part 13c (each short side portion 10c) so that the bulging portion P is formed in each of a pair of opposite sides of the coil 13. On the other hand, the long side of each layer of the coil 13 to be inserted in the slot 132 is maintained in a straight form without deformation, thereby contributing to an improved space factor in the slot 132.

The present invention is explained in the above embodiment but not limited thereto. The present invention may be embodied in other specific forms without departing from the essential characteristics thereof.

For instance, although the above embodiment explains the structure of the winding apparatus 20 with reference to FIGS. 1 and 2, the apparatus design such as shape and power may be changed. For instance, furthermore, the positions of the clamp unit 30 and the wire feeding mechanism 40 are desired to be as near as possible to each other in consideration of rotation of the movable base 57. Accordingly, the clamp unit 30 and the wire feeding mechanism 40 may be arranged in a more preferable layout.

REFERENCE SIGNS LIST

10 Flat rectangular conductor
10a Edgewise bent portion
13 Coil
20 Edgewise-bending winding apparatus
21 First wire guide
22 Second wire guide
23 Bending tool
24 Flange retainer
24a Flange
24b Shaft
25 Wire guide
30 Clamp unit
40 Wire feeding mechanism
50 Servo motor for bending
51 Servo motor for clamping
52 First gear
53 Second gear
54 Rotary element
A Clearance
P1 First deformed portion
P2 Second deformed portion
R Radius
W Minimum width

The invention claimed is:

1. A winding method of forming a coil having a long side and a short side by edgewise bending a flat rectangular conductor by use of a wire guide, a first side surface supporting tool, and a support member, the method comprising:

a first step of performing edgewise bending of a first bent portion by bending a part of the flat rectangular conductor to be the long side about an outer periphery of the support member by rotating the first side surface supporting tool in the direction of clockwise about the support member after conducting a long-side feeding operation; and a second step of performing edgewise bending of a second bent portion by bending another part of the flat rectangular conductor to be the long side about the outer periphery of the support member by rotating the wire guide in the direction of counterclockwise about the support member after conducting a short-side feeding operation, the first step of the clockwise edgewise bending and the second step of the counterclockwise edgewise bending being alternately conducted so that a bulging portion is formed by the support member in bending the flat rectangular conductor 90 degrees about the support member in a concentrated manner in a side of the coil located between predetermined adjacent two of the edgewise bent portions.

2. A winding apparatus for forming a coil having a long side and a short side by edgewise bending a flat rectangular conductor by use of a wire guide, a first side surface supporting tool, and a support member, the apparatus comprising:

the support member for supporting an inner periphery of the flat rectangular conductor during edgewise bending of the flat rectangular conductor;

the first side surface supporting tool that is rotatable and will support a side surface of the flat rectangular conductor; and the wire guide that is rotatable and will support the side surface of the flat rectangular conductor and be placed adjacent to the first side surface supporting tool with respect to the support member, wherein the apparatus is adapted to perform:

a first step of performing edgewise bending of a first bent portion by bending a part of the flat rectangular conductor to be the long side about an outer periphery of the support member by rotating the first side surface supporting tool in the direction of clockwise about the support member after conducting a long-side feeding operation and a second step of performing edgewise bending of a second bent portion by bending another part of the flat rectangular conductor to be the long side about the outer periphery of the support member by rotating the wire guide in the direction of counterclockwise about the support member after conducting a short-side feeding operation so that a bulging portion is formed by the support member in bending the flat rectangular conductor 90 degrees about the support member in a concentrated manner in a side of the coil located between predetermined adjacent two of the edgewise bent portions, wherein the first step of the clockwise edgewise bending and the second step of the counterclockwise edgewise bending are performed alternately.

* * * * *